United States Patent [19]

Schmidt et al.

[11] 4,264,330

[45] Apr. 28, 1981

[54] METHOD OF VISUALIZING THE FLOW PATTERN OF A FLUID USING OPTICALLY ACTIVE, RADIOACTIVE OR CHEMICALLY ACTIVE PARTICLES OF DESIRED DENSITY

[76] Inventors: Dieter Schmidt, Steinbreite 16a; Volkmar Delitzsch, Immanuel-Kant-Str. 32, both of, D-3400 Goettingen, Fed. Rep. of Germany

[21] Appl. No.: 98,038

[22] Filed: Nov. 28, 1979

Related U.S. Application Data

[62] Division of Ser. No. 900,813, Apr. 27, 1978, abandoned.

[30] Foreign Application Priority Data

May 16, 1977 [DE] Fed. Rep. of Germany ....... 2722151

[51] Int. Cl.$^3$ ..................... G01N 21/17; G09B 23/12; G01F 1/70
[52] U.S. Cl. .............. 23/230 R; 252/301.21; 252/301.35; 252/408
[58] Field of Search ................ 23/230 R; 252/301.21, 252/301.35, 408; 73/32, 440; 250/461 R

[56] References Cited

U.S. PATENT DOCUMENTS

| Re. 29,334 | 8/1977 | Ryan et al. ........................... 149/18 |
| 3,177,153 | 4/1965 | Pommer et al. ................. 252/301.21 |
| 3,635,832 | 1/1972 | Toney ............................ 252/301.35 |
| 3,843,718 | 10/1974 | Luethi ............................ 252/301.21 |
| 3,856,550 | 12/1974 | Bens et al. ..................... 252/301.35 |
| 3,861,886 | 1/1975 | Meloy ................................... 252/408 |
| 3,897,284 | 7/1975 | Livesay ................................ 252/408 |
| 4,058,480 | 11/1977 | Lohmann et al. ............... 252/301.21 |
| 4,115,535 | 9/1978 | Glaever ................................... 424/1 |

OTHER PUBLICATIONS

Roberson, "The Development of a Flow Visualization Technique," Nat'l. Gas Turbine Estab., Report No. R.181, Nov. 1955.

*Primary Examiner*—Ronald Serwin
*Attorney, Agent, or Firm*—Toren, McGeady and Stanger

[57] ABSTRACT

The invention is concerned with particles consisting of a compound of an active material and foamed plastic, the mean density of the particles being adjustable to the special value of a foregiven fluid such that they can float in the fluid. Particles of this kind can be used (as "tracer" particles) for disturbance-free visualization of fluid flows and for suspending active materials of higher density than that of the fluid homogeneously in the fluid volume.

Concerning the first usage, the flow pattern of a flowing aqueous fluid is visualized by spacedly suspending in the fluid approximately spherical particles of a foamed plastic labeled with zinc sulfide phosphor and having a diameter smaller than 0.5 millimeters and by exciting the phosphor with pulses from a UV laser. Successive frames taken by an electronic camera from an electronically intensified image of the liquid permit the direction and velocity of particle movement to be monitored as a measure of the flow pattern of the fluid which is not affected by the presence of the particles.

3 Claims, 1 Drawing Figure

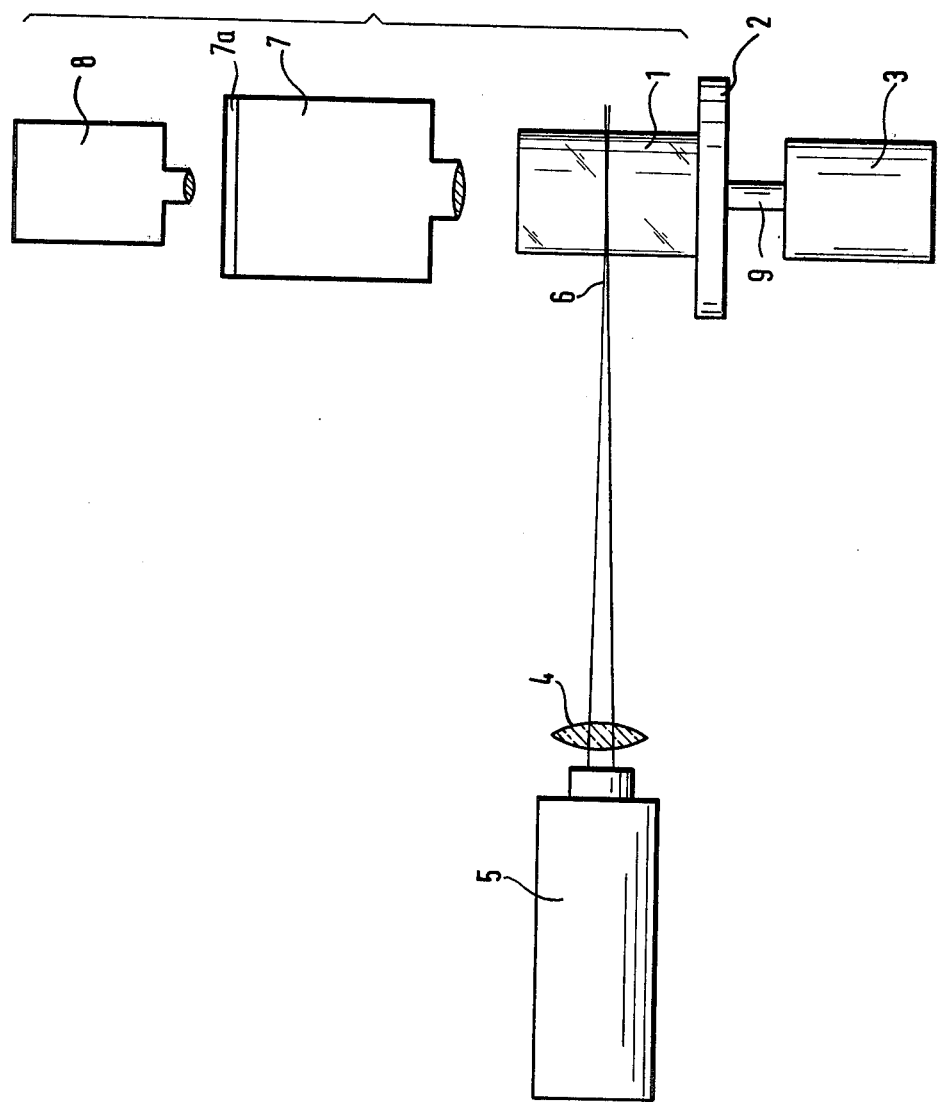

METHOD OF VISUALIZING THE FLOW PATTERN OF A FLUID USING OPTICALLY ACTIVE, RADIOACTIVE OR CHEMICALLY ACTIVE PARTICLES OF DESIRED DENSITY

This is a division of application Ser. No. 900,813, filed on Apr. 27, 1978, and now abandoned.

It has been proposed by E. C. Roberson (Report of the National Gasturbine Establishment No R.181, 1955) to suspend opaque polystyrene spheres in an aqueous solution of common salt having the same specific gravity as the polystyrene in order to permit observation of flow patterns in the transparent liquid.

To be observed and photographed with the necessary precision, the known particles have to be so large as to affect the flow pattern to be observed by their very presence. When they are small enough not to influence the phenomena to be observed, their movements cannot be monitored by the usual methods.

It is a primary object of the invention to provide particles which may be suspended in the fluid to be studied, whose presence has no significant effect on the flow pattern, and whose movements can be monitored precisely as a measure of the flow pattern.

BRIEF DESCRIPTION OF THE DRAWING

The drawing shows an apparatus for producing and monitoring a complex flow pattern in a fluid.

It has been found that small particles of cellular, synthetic resin composition may be observed with great precision if labeled with an agent capable of emitting electromagnetic radiation of a wavelength different from the wavelength of incident electromagnetic radiation, and that they do not affect the flow pattern to be studied if they are smaller than 0.5 millimeter.

The necessary amount of labeling agent varies with the nature of the labeling agent and its distribution in the resin composition. As little as 2%, based on the weight of the synthetic resin carrier may be sufficient if the labeling agent is concentrated on the outer surface of the carrier particles, as by adhesion, and up to 80% may be advantageous if the labeling agent is located predominantly in the gas-filled cells of the carrier material. Intermediate concentrations are generally preferable for a uniformly distributed labeling agent While the nature of the resin composition is not in itself critical, the commercially available, foamable polystyrene and polyurethane compositions have been found to be adequate under all conditions in which the flow pattern of aqueous liquids is to be investigated. However, equally good results have been achieved by means of particles of polyester resin coating hollow microspheres of vinylidene chloride-acrylonitrile copolymer, and other carrier materials will readily suggest themselves.

It is most convenient to mix the labeling agent with the synthetic resin composition prior to foaming if the labeling agent is to be distributed throughout the carrier material. The nature of the gas confined within the cells of the foamed carrier is not critical, and its amount if chosen to give the foamed material a density as closely similar as possible to that of the fluid whose flow is to be observed. Any significant deviation from equal specific gravity of the suspended particles and the flowing fluid unfavorably affects the precision of the observed movements.

The labeling agent may be a solid material or a liquid in finely dispersed form. Radioactive tracers emit electromagnetic radiation different from that of ambient light and may be employed, but material capable of emitting secondary radiation in respone to incident primary radiation of a different wavelength require fewer precautions in handling. Crystalline phosphors are preferred for this reason, and the most widely used phosphor material, copper-doted zinc sulfide, has been used successfully. The use of other luminescent materials, however, is within the scope of this invention. Zinc sulfide phosphors emit light visible to the human eye adapted to darkness as late as 20 hours after removal from an exciting light source.

Photochromatic liquids may be used instead of solid phosphors. An ethanol solution of 2-(2',4'-dinitrobenzyl)-pyridine changes from colorless to blue within less than 3 microseconds when irradiated with ultraviolet light, and the color is retained for several milliseconds at ambient temperature after the exciting radiation ceases. A similar color change occurs in certain spiropyran derivatives, such as 2, 2'-spiro[2, 2'H)-6-nitrochrom-3-ene-N, 3,3'-trimethylindoline which reversibly changes to blue after excitation by five UV pulses of 0.2 mWs and 10 ns duration.

Spherical, or approximately spherical particles interfere least with the flow pattern of the fluid to be observed at equal size and are preferred for this reason.

Other features and the attendant advantages of this invention will readily be appreciated as the same becomes better understood by reference to the following detailed description of a preferred embodiment when considered in connection with the appended drawing whose sole FIGURE illustrates apparatus for producing a complex flow pattern in a fluid and for monitoring the pattern.

An upright, cylindrical vessel 1 of UV-permeable borosilicate glass is fastened to a turntable 2 mounted for rotation about the axis of the vessel in a conventional manner, not specifically illustrated. A rubber hose 9 couples the turntable to the output shaft of an electric step-by-step motor 3. The motor is fastened to a fixed support by vibration dampening mounting elements, not shown, and the hose connection further prevents transmission of vibration from the motor to the contents of the vessel 1.

The ultraviolet beam 6 of a laser 5 is focused on the vessel 1 by means of a biconvex lens 4 having a focal length of 600 mm in such a manner that the practically parallel beam passing through the vessel axis at right angles has a diameter of less than one millimeter.

The objective lens system of an electronic image amplifier 7 is directed axially toward the contents of the vessel 1, and the image produced on the cathode screen 7a of the amplifier 7 is recorded at equal intervals by an electronic camera 8, the recorded pictures being monitored by a suitable storage system. The electronically suored pictures can be recalled again by purely electronic means and the electric data thus obtained be feed directly into an electronic data handling system for evaluation.

The following example is further illustrative of the particulate material of the invention and of its typical use in the illustrated apparatus.

EXAMPLE

A commercially available polystyrene solution containing an aliphatic hydrocarbon as a foaming agent ("Hostyren N 7000") was mixed intimately with 10 g copper-doped zinc sulfide powder, and the mixture was foamed in a known manner by means of steam to produce a foam having an average density of one gram per cubic centimeter. When the foam was fully hardened, it was ground under liquid nitrogen, and the ground material was fractionated by sieving. The fraction passing through a screen having apertures of 0.5 mm was suspended in water, and sodium chloride was dissolved in the suspension in small, repeated batches until the amount of lighter particles rising to the surface was about equal to the amount of particles sinking to the bottom. The stable, central portion of the suspension was carefully drawn off, separated from the liquid by filtration under low suction, and the filtered particles were suspended in a fresh batch of salt solution of the same concentration as the liquid employed for fractionation according to density. The stable suspension so obtained contained approximately one particle per 10 $cm^3$. No further segregation of particles could be observed over an extended period.

The suspension was placed in the vessel 1, the vessel was turned stepwise, and its content was irradiated with ultraviolet light having a wavelength of 337.1 nm at a frequency of 100 pulses per second, each pulse having a duration of 10 ns and an energy of 0.2 mWs. The lens 4 consisted of UV-permeable glass having a maximum thickness of 5 mm and passed 89% of the energy emitted by the laser 5.

The camera 8 took 40 frames per second, and the movement of individual exited phosphor particles in the agitated aqueous suspension could readily be seen and measured with the aid of the monitoring storage system.

Particles of cellular synthetic resin composition containing other solid or liquid labeling or active (e.g. catalytic) agents are readily prepared in the manner outlined above. Soluble labelling agents, such as the photochromatic compounds referred to above may be applied to the surfaces of the foamed and hardened particles in the form of their solutions, and the solvent evaporated. Instead of hydrocarbon or the like as a foaming agent, the labelling agents themselves may catalyze the formation of gas from the synthetic resin composition, and the desired density of the foamed material controlled in a known manner.

As to further uses of the particles which are subject of the invention, they are all based on the possibility given by the invention to make small pieces of anyhow active material floating in a fluid of lower density than that of this material. By this means, such pieces can be distributed homogeneously within a volume of a fluid for the purpose of exposing the fluid uniformly to the influence of radioactive radiation or of a slowly acting catalyst.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the attached claims.

What is claimed is:

1. A method of visualizing the flow pattern of a fluid which comprises suspending in said fluid particles of a particulate material consisting essentially of a carrier of cellular synthetic resin composition, gas confined in the cells of said resin composition, and a labeling agent secured to said carrier in an amount of 2% to 80% of the weight of said carrier and capable of emitting electromagnetic radiation of a first wave length when exposed to incident electromagnetic radiation of a second wave length different from said first wave length, the particle size of said material being smaller than 0.5 millimeter, in spaced relationship and monitoring the displacement of said particles while said fluid flows.

2. A method as set forth in claim 1, wherein said displacement is monitored by producing a sensible signal indicative of respective positions of said particles at successive times.

3. A method as set forth in claim 1, wherein the density of said particulate material is at least approximately equal to the density of said fluid, the fluid being a liquid.

* * * * *